(12) United States Patent
Yamada

(10) Patent No.: US 11,742,746 B2
(45) Date of Patent: Aug. 29, 2023

(54) SWITCHING CONTROL CIRCUIT AND POWER SUPPLY CIRCUIT

(71) Applicant: FUJI ELECTRIC CO., LTD., Kawasaki (JP)

(72) Inventor: Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 102 days.

(21) Appl. No.: 17/511,070

(22) Filed: Oct. 26, 2021

(65) Prior Publication Data

US 2022/0209647 A1 Jun. 30, 2022

(30) Foreign Application Priority Data

Dec. 24, 2020 (JP) ................................ 2020-214663

(51) Int. Cl.
*H02M 1/14* (2006.01)
*H02M 1/08* (2006.01)
*H02M 1/42* (2007.01)
*H02M 1/00* (2006.01)

(52) U.S. Cl.
CPC ........... *H02M 1/14* (2013.01); *H02M 1/0025* (2021.05); *H02M 1/08* (2013.01); *H02M 1/4208* (2013.01)

(58) Field of Classification Search
CPC .. H02M 1/14; H02M 1/0025; H02M 1/14208; H02M 1/15; H02M 1/0009; H02M 1/007; H02M 1/4225; H02M 3/157; H02M 7/06
See application file for complete search history.

(56) References Cited

U.S. PATENT DOCUMENTS

| 5,682,306 A | 10/1997 | Jansen | |
| 2008/0272757 A1* | 11/2008 | Melanson | H02M 1/4225 323/282 |
| 2011/0292699 A1* | 12/2011 | Goerke | H02M 1/15 363/84 |

(Continued)

FOREIGN PATENT DOCUMENTS

| CN | 204706890 U | * 10/2015 | |
| CN | 110086341 A | * 8/2019 | H02M 3/158 |

(Continued)

*Primary Examiner* — Jeffrey A Gblende
*Assistant Examiner* — Jye-June Lee
(74) *Attorney, Agent, or Firm* — Rabin & Berdo, P.C.

(57) ABSTRACT

A switching control circuit for controlling a power supply circuit that includes an inductor receiving a rectified voltage corresponding to an AC voltage, and a transistor controlling an inductor current flowing through the inductor. The switching control circuit controls switching of the transistor, and includes an output circuit, a processing circuit and a drive signal output circuit. The output circuit sequentially receives a first voltage, which fluctuates at a frequency twice a frequency of the AC voltage, and outputs, as a second voltage, the received first voltage after a delay of a predetermined period of time. The processing circuit processes the first voltage based on a value corresponding to the second voltage, to remove a ripple component generated in an output voltage and contained in the first voltage. The drive signal output circuit outputs a drive signal for driving the transistor, in response to a processing result of the processing circuit.

11 Claims, 10 Drawing Sheets

(56) References Cited

U.S. PATENT DOCUMENTS

2017/0215238 A1* 7/2017 Kim .................. H02M 1/12
2017/0366081 A1* 12/2017 Beinlich ............. H02M 1/15

FOREIGN PATENT DOCUMENTS

| CN | 112688545 A | * | 4/2021 |
| CN | 112713759 A | * | 4/2021 |
| JP | H09-121539 A | | 5/1997 |
| JP | H10-42569 A | | 2/1998 |
| JP | H10-66344 A | | 3/1998 |
| JP | 6405906 B2 | | 10/2018 |

* cited by examiner

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2020-214663 filed on Dec. 24, 2020, the entire disclosure of which is hereby incorporated by reference herein.

BACKGROUND

Technical Field

The present disclosure relates to a switching control circuit and a power supply circuit.

Description of the Related Art

There are power supply circuits each configured to generate a direct-current (DC) voltage from an alternating-current (AC) voltage by switching a transistor (for example, Japanese Patent No. 6405906 and Japanese Patent Application Publication Nos. H10-066344, H9-121539, and H10-042569).

A common switching control circuit switches a transistor in response to an output voltage such that the output voltage reaches a target level. When such a switching control circuit is used, a ripple component caused by a frequency of the AC voltage may appear in the output voltage.

The present disclosure is directed to provision of a switching control circuit capable of reducing a ripple component in an output voltage.

SUMMARY

A first aspect of the present disclosure is a switching control circuit for controlling a power supply circuit configured to generate an output voltage of a target level from an alternating-current (AC) voltage inputted thereto, the power supply circuit including an inductor configured to receive a rectified voltage corresponding to the AC voltage, and a transistor configured to control an inductor current flowing through the inductor, the switching control circuit being configured to control switching of the transistor, the switching control circuit comprising: an output circuit configured to sequentially receive a first voltage, which contains a ripple component that has been generated in the output voltage and that fluctuates at a frequency twice a frequency of the AC voltage, and output, as a second voltage, the received first voltage after a delay of a predetermined period of time; a processing circuit configured to process the first voltage based on a value corresponding to the second voltage, which also fluctuates at the frequency twice the frequency of the AC voltage, so as to remove the ripple component contained in the first voltage; and a drive signal output circuit configured to output a drive signal for driving the transistor, in response to a processing result of the processing circuit.

A second aspect of the present disclosure is a power supply circuit configured to generate an output voltage of a target level from an alternating-current (AC) voltage inputted thereto, the power supply circuit comprising: an inductor configured to receive a rectified voltage corresponding to the AC voltage; a transistor configured to control an inductor current flowing through the inductor; and a switching control circuit configured to control switching of the transistor, the switching control circuit including an output circuit configured to sequentially receive a first voltage, which contains a ripple component that has been generated in the output voltage and that fluctuates at a frequency twice a frequency of the AC voltage, and output, as a second voltage, the received first voltage after a delay of a predetermined period of time, a processing circuit configured to process the first voltage based on a value corresponding to the second voltage, which also fluctuates at the frequency twice the frequency of the AC voltage, so as to remove the ripple component contained in the first voltage, and a drive signal output circuit configured to output a drive signal for driving the transistor, in response to a processing result of the processing circuit.

BRIEF DESCRIPTION OF THE DRAWINGS

FIG. 5 is a diagram illustrating an example of an output circuit 51a.

DETAILED DESCRIPTION

At least following matters will become apparent from the descriptions of the present specification and the accompanying drawings.

Embodiment

Figure 1:
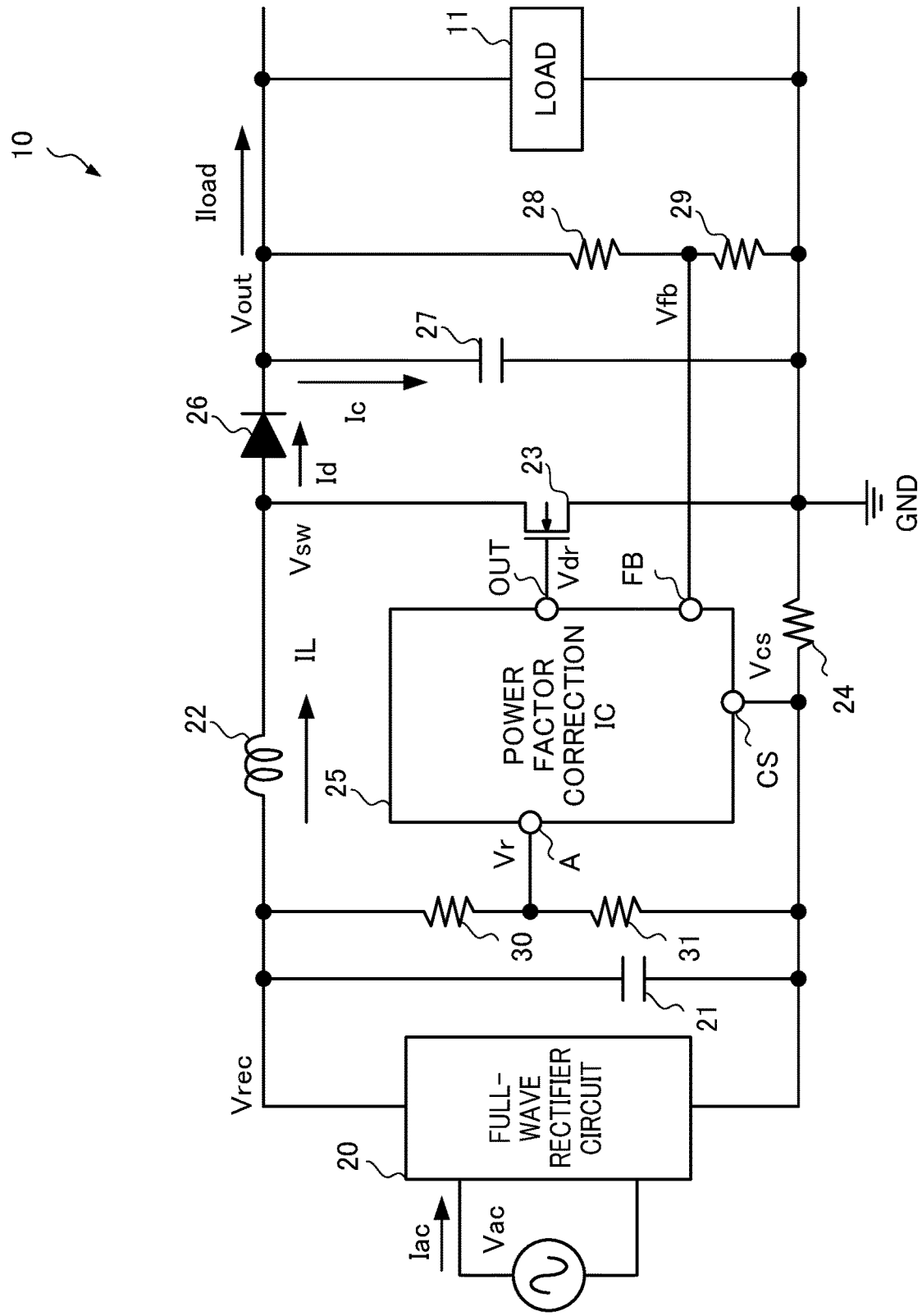
FIG. 1 is a diagram illustrating an example of an AC-DC converter 10.

FIG. 1 is a diagram illustrating an example of a configuration of an AC-DC converter 10, which is one embodiment of the present disclosure. The AC-DC converter 10 is a boost chopper type power supply circuit that generates an output voltage Vout of a target level from an alternating-current (AC) voltage Vac of a commercial power supply inputted thereto. Note that the AC-DC converter 10 applies the output voltage Vout to a load 11 to supply power and passes a current Iload.

The AC-DC converter 10 includes a full-wave rectifier circuit 20, capacitors 21 and 27, an inductor 22, an NMOS transistor 23, resistors 24 and 28 to 31, a power factor correction IC 25, and a diode 26.

The full-wave rectifier circuit 20 full-wave rectifies a predetermined AC voltage Vac inputted thereto, and applies a resultant voltage to the capacitor 21 and the inductor 22 as an input voltage Vrec. Note that the AC voltage Vac is, for example, a voltage having an effective value of 140 to 240 V and a frequency of 50 to 60 Hz. In an embodiment of the present disclosure, the voltages described below are each basically a difference in potential relative to a reference point (GND in FIG. 1), however, the AC voltage Vac refers to a voltage between terminals.

The capacitor 21 smooths the input voltage Vrec, and the capacitor 27 configures a boost chopper circuit together with the inductor 22, the NMOS transistor 23, and the diode 26. Accordingly, a charge voltage of the capacitor 27 is a direct-current (DC) output voltage Vout. Note that a current flowing through the diode 26 is referred to as current Id and a current flowing through the capacitor 27 is referred to as current Ic.

The NMOS transistor 23 is a switching device to control power to the load 11 of the AC-DC converter 10. Although the NMOS transistor 23 is an N-type metal oxide semiconductor (MOS) transistor in an embodiment of the present disclosure, the transistor 23 may be, for example, a bipolar transistor or the like. Furthermore, a gate electrode of the NMOS transistor 23 is coupled to a terminal OUT of the power factor correction IC 25.

The resistor 24 detects an inductor current IL flowing through the inductor 22 upon turning on of the NMOS transistor 23. The resistor 24 has one end coupled to a source electrode of the NMOS transistor 23 and the other end coupled to a terminal CS of the power factor correction IC 25.

The power factor correction IC 25 is an integrated circuit that controls switching of the NMOS transistor 23 such that the level of the output voltage Vout reaches the target level (for example, 400 V), while improving the power factor of the AC-DC converter 10. Specifically, the power factor correction IC 25 drives the NMOS transistor 23 based on the inductor current IL and the output voltage Vout. Although details of the power factor correction IC 25 will be described later, the power factor correction IC 25 has terminals CS, FB, OUT, and A. Note that, in an embodiment of the present disclosure, terminals other than the terminals CS and the like of the power factor correction IC 25 are omitted for the sake of convenience.

The resistors 28 and 29 configure a voltage divider circuit that divides the output voltage Vout, and generates a feedback voltage Vfb used in switching NMOS transistor 23. Note that the feedback voltage Vfb is generated at a node to which the resistors 28 and 29 are coupled, and is applied to the terminal FB.

The resistors 30 and 31 configure a voltage divider circuit that divides the rectified voltage Vrec, and generates a voltage Vr used in switching the NMOS transistor 23. Note that the voltage Vr generated is at a node to which the resistors 30 and 31 are coupled, and is applied to the terminal A.

<<<Power Factor Correction IC 25>>>
==Configuration of Power Factor Correction IC 25==

Figure 2:
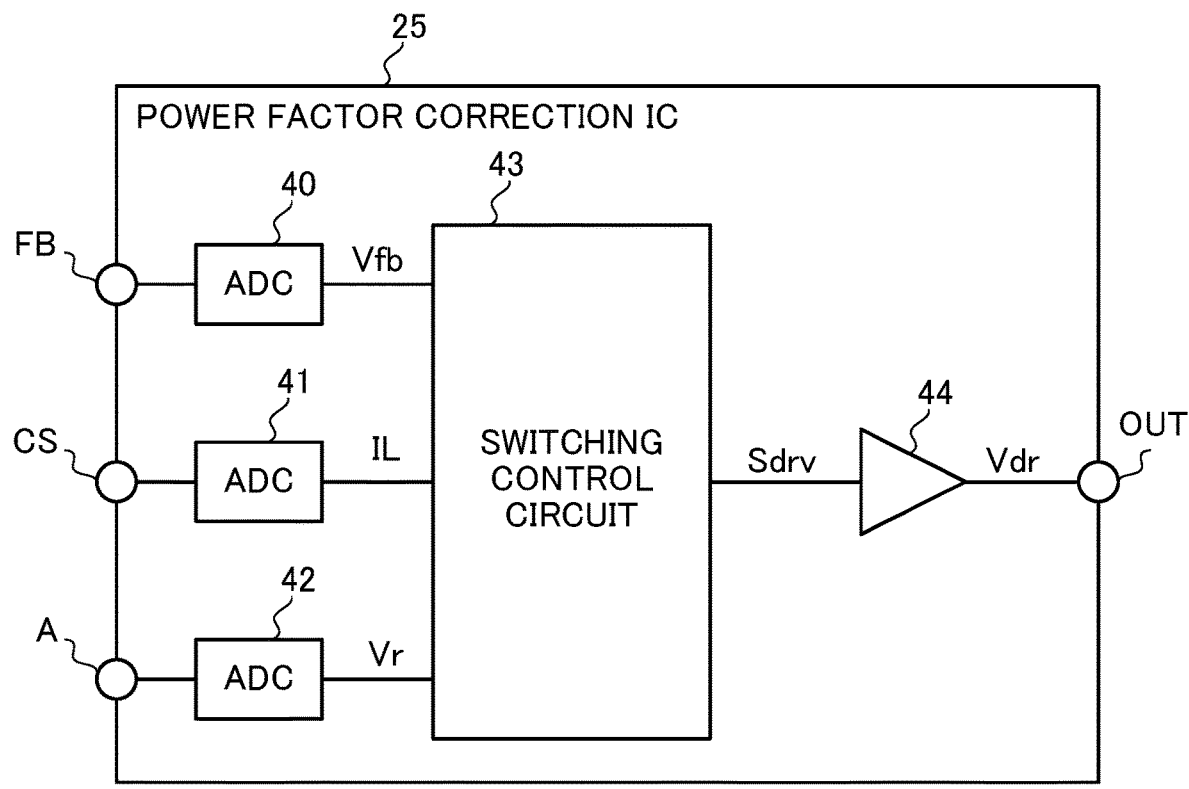
FIG. 2 is a diagram illustrating an example of a power factor correction IC 25.

FIG. 2 is a diagram illustrating a configuration of the power factor correction IC 25. The power factor correction IC 25 includes analog-to-digital converters (AD converters, ADCs) 40 to 42, a switching control circuit 43, and a buffer circuit 44.

The AD converter 40 performs an AD conversion to the feedback voltage Vfb, and the AD converter 41 performs an AD conversion to a voltage indicating the inductor current IL. Moreover, the AD converter 42 performs an AD conversion to the voltage Vr. Note that the voltage indicating the inductor current IL is detected at the resistor 24, and is level-shifted by a level-shifter circuit (not illustrated), and then the polarity thereof is inverted by an inverting circuit (not illustrated).

In addition, in an embodiment of the present disclosure, the AD converted feedback voltage Vfb, the AD converted voltage indicating the inductor current IL, and the AD converted voltage Vr are referred to as feedback voltage Vfb, inductor current IL, and voltage Vr, respectively, for the sake of convenience.

In this example, the AD converter 40 performs an AD conversion to the feedback voltage Vfb that is substantially a DC voltage. Meanwhile, the AD converter 41 performs an AD conversion to the voltage that indicates the inductor current IL and that changes according to the switching of the NMOS transistor 23. Accordingly, a sampling cycle SP1 of the AD converter 40 is longer than a sampling cycle SP2 of the AD converter 41.

Specifically, the sampling frequency of the AD converter 41 is 30 kHz to 300 kHz and is substantially the same frequency as the switching frequency of the NMOS transistor 23. Meanwhile, the sampling frequency of the AD converter 40 is at least 100 Hz or higher and is lower than the switching frequency of the NMOS transistor 23.

Note that the AD converter 40 corresponds to a "first AD converter", and the AD converter 41 corresponds to a "second AD converter". Moreover, the sampling cycle SP1 corresponds to a "first sampling cycle", and the sampling cycle SP2 corresponds to a "second sampling cycle".

The switching control circuit 43 outputs a drive signal Sdrv based on the feedback voltage Vfb, the inductor current IL, and the voltage Vr.

The buffer circuit 44 amplifies the drive signal Sdrv and outputs a voltage Vdr for driving the NMOS transistor 23.

<<<Ripple Component in Output Voltage Vout>>>

Figure 3:
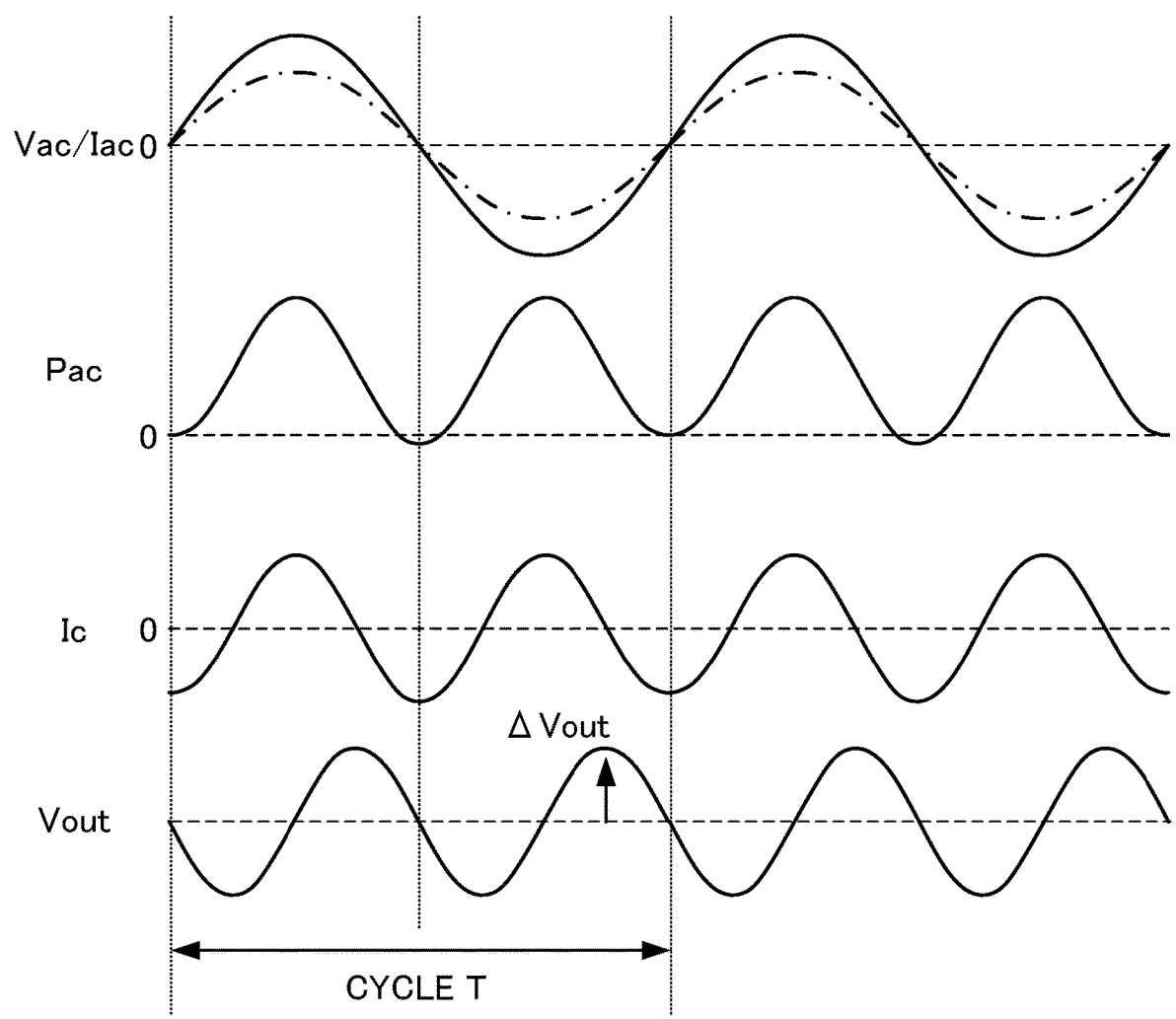
FIG. 3 is a diagram explaining a ripple component ΔVout generated in an output voltage Vout.

FIG. 3 is a diagram explaining a ripple component generated in the output voltage Vout upon switching of the NMOS transistor 23. Note that a solid line given in Vac/Iac is the AC voltage Vac and a dashed-dotted line given in Vac/Iac is an input current Iac.

First, the AC voltage Vac, the input current Iac, and input power Pac can be expressed as follows:

$$Vac = V\sin\theta \quad (1)$$

$$Iac = I\sin\theta \quad (2)$$

$$Pac = Vac \times Iac = VI\sin^2\theta \quad (3)$$
$$= VI/2 - VI/2 \times \cos 2\theta$$

where V is the amplitude of the AC voltage Vac and I is the amplitude of the input current Iac.

When the current flowing through the diode 26 of the AC-DC converter 10 is the current Id, the current Id can be expressed as follows using the output voltage Vout:

$$Id = Pac/Vout \quad (4)$$
$$= VI/2/Vout - VI/2/Vout \times \cos 2\theta.$$

Here, assuming that the first term of the formula (4) is a DC component, in other words, the current Iload, the current Ic can be expressed as follows:

$$Ic = -VI/2/Vout \times \cos 2\theta \quad (5)$$
$$= -VI/2/Vout \times \cos(4\Pi ft)$$

where when $\theta = 2\pi ft$ and T is the cycle of the AC voltage Vac, $\theta = 2\pi t/T$.

The ripple component ΔVout in the output voltage Vout is obtained by dividing a time integral value of the current Ic by a capacitance value C of the capacitor 27 and can be expressed as follows:

$$\Delta Vout = -VI/4/Vout/C \times \sin 2\theta \qquad (6)$$
$$= -VI/(8\Pi f \times Vout \times C) \times \sin(4\Pi ft).$$

Accordingly, the output voltage Vout outputted by the AC-DC converter 10 fluctuates at a frequency twice the frequency of the AC voltage Vac, and the amplitude of the output voltage Vout includes the ripple component ΔVout that is inversely proportional to the capacitance value C.

Here, an increase in the capacitance value C reduces the ripple component ΔVout. However, to increase the capacitance value C, a large capacitor 27 is needed. Using the large capacitor 27 increases the size of the AC-DC converter 10 and is thus not practical.

Accordingly, in order to remove the ripple component ΔVout in the output voltage Vout, it is only needed to, for example, add, to the ripple component ΔVout, a ripple component ΔVout that is delayed by T/4 so as to have the same magnitude as that of the ripple component ΔVout and a polarity opposite to that of the ripple component ΔVout. Alternatively, in order to remove the ripple component ΔVout in the output voltage Vout, it is only needed to, for example, subtract, from the ripple component ΔVout, a ripple component ΔVout that is delayed by T/2 so as to have the same magnitude and the same polarity as those of the ripple component ΔVout.

==Switching Control Circuit 43==

Figure 4:
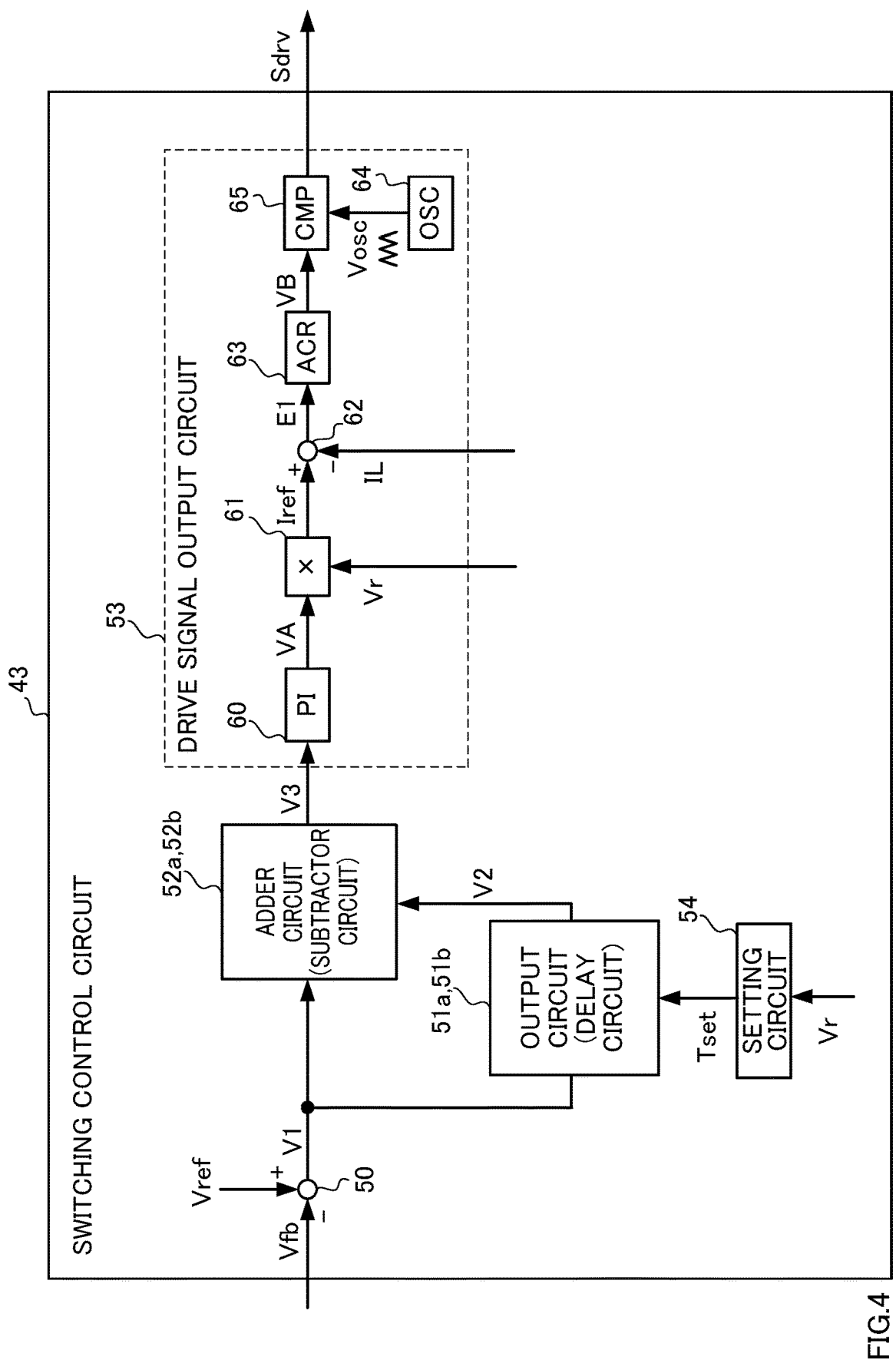
FIG. 4 is a diagram illustrating a configuration of a switching control circuit 43.

FIG. 4 is a diagram illustrating a configuration of the switching control circuit 43. The switching control circuit 43 controls the output voltage Vout while removing the ripple component ΔVout from the output voltage Vout. Moreover, the switching control circuit 43 outputs the drive signal Sdrv so as to lower the output voltage Vout when the output voltage Vout rises, and outputs the drive signal Sdrv so as to raise the output voltage Vout when the output voltage Vout drops. The switching control circuit 43 includes a subtractor 50, an output circuit 51, an adder circuit 52a, a drive signal output circuit 53, and a setting circuit 54.

The subtractor 50 subtracts the feedback voltage Vfb from a reference voltage Vref, and outputs an error between the reference voltage Vref and the feedback voltage Vfb as a voltage V1. Note that the subtractor 50 corresponds to an "error output circuit".

==Output Circuit 51==

The output circuit 51 outputs the temporally-prior voltage V1, as a voltage V2, to remove the ripple component in the feedback voltage Vfb. Specifically, the output circuit 51 sequentially receives the voltage V1 containing the ripple component ΔVout that fluctuates at the frequency twice the frequency of the AC voltage Vac, and outputs, as the voltage V2, the received voltage V1 after a delay of a predetermined period of time P. Accordingly, the voltage V2 also fluctuates at the frequency twice the frequency of the AC voltage Vac. In an embodiment of the present disclosure, the predetermined period of time P is T/4. Note that the voltage V1 corresponds to a "first voltage", and the voltage V2 corresponds to a "second voltage".

==Output Circuit 51a==

Figure 5:
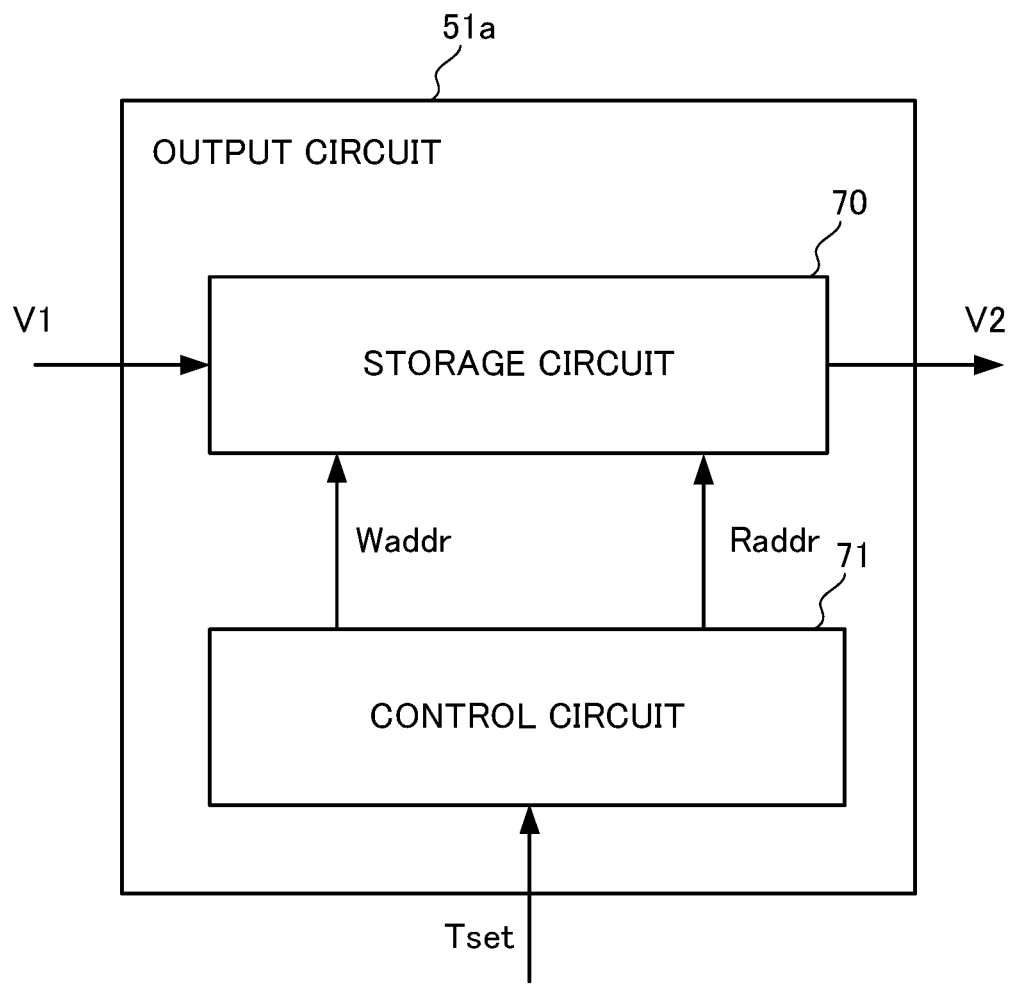

FIG. 5 is a diagram illustrating an example of an output circuit 51a which is one embodiment of the output circuit 51.

The output circuit 51a includes a storage circuit 70 and a control circuit 71. The storage circuit 70 stores the voltage V1, and the control circuit 71 causes the storage circuit 70 to output, as the voltage V2, the voltage V1 stored in the storage circuit 70.

Specifically, the storage circuit 70 writes the voltage V1 based on a write address Waddr from the control circuit 71, and reads the voltage V2 based on a read address Raddr from the control circuit 71. Moreover, the control circuit 71 calculates the predetermined period of time T/4, which is an interval between the write address Waddr and the read address Raddr, in response to a cycle setting signal Tset from the setting circuit 54, which will be described later, and outputs the write address Waddr and the read address Raddr.

Figure 6:
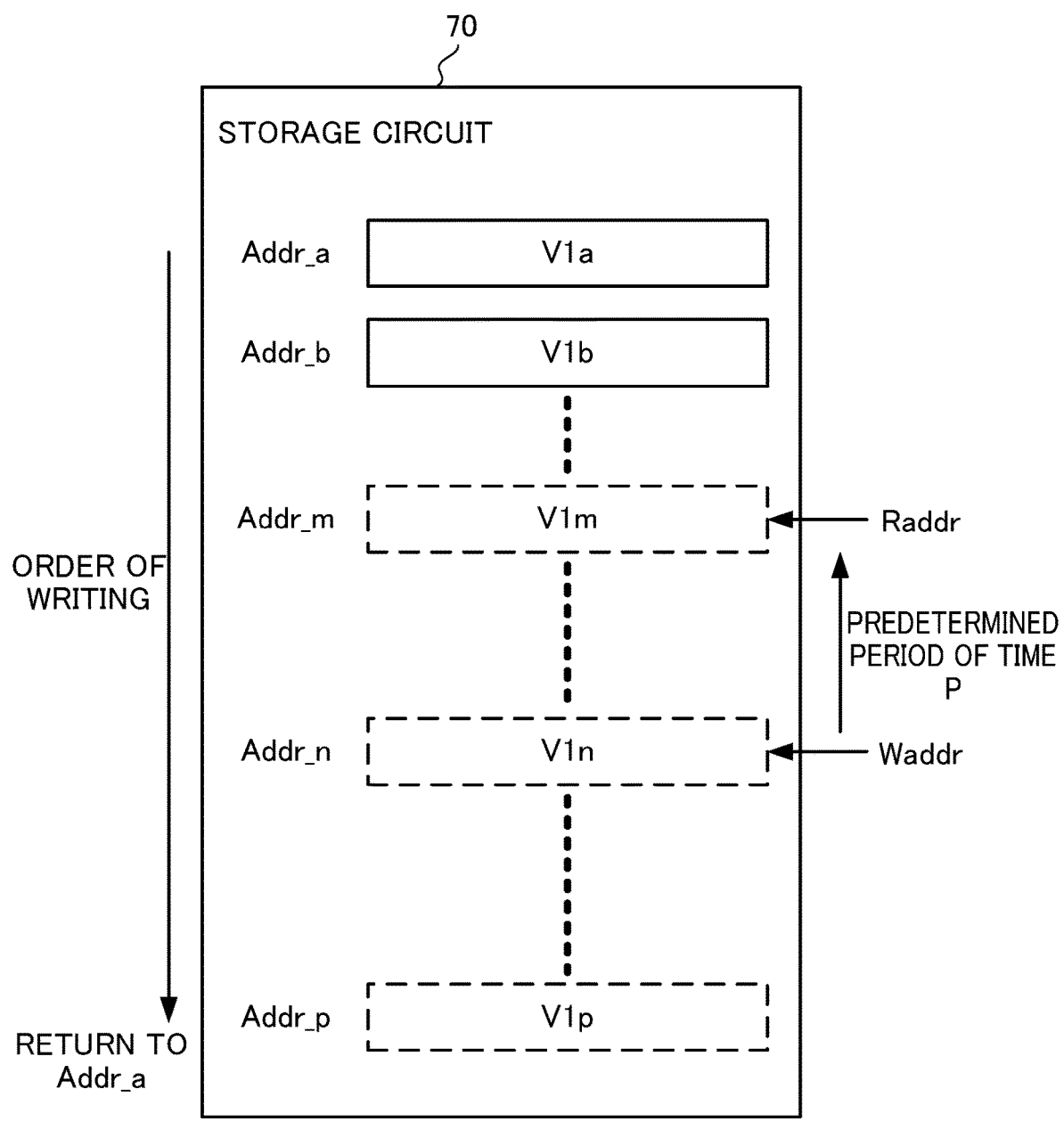
FIG. 6 is a diagram illustrating an example of a storage circuit 70.

FIG. 6 is a diagram illustrating an example of the storage circuit 70. The storage circuit 70 is configured with, for example, a circular buffer using part of a memory (not illustrated), and operates based on the write address Waddr and the read address Raddr from the control circuit 71.

Specifically, the storage circuit 70 starts writing or reading the write address Waddr or the read address Raddr from the address Addr_a and, when the write address Waddr or the read address Raddr reaches an address Addr_p, performs writing or reading again from the address Addr_a. Accordingly, the storage circuit 70 outputs, as the voltage V2, the received voltage V1 after a delay of the predetermined period of time T/4.

==Adder Circuit 52a==

Referring to FIG. 4 again, the adder circuit 52a processes the voltage V1 based on a value corresponding to the voltage V2 to remove the ripple component included in the voltage V1. The adder circuit 52a adds, as the voltage V2, the voltage V1 obtained by delaying the voltage V1 by the predetermined period of time T/4 to the current voltage V1. In an embodiment of the present disclosure, the output circuit 51a outputs, as the voltage V2, the voltage V1 having been delayed by the predetermined period of time T/4, and the adder circuit 52a adds the voltage V2 to the voltage V1.

Although the adder circuit 52a adds the voltage V2 to the voltage V1, the present disclosure is not limited thereto. Specifically, the adder circuit 52a may add a mean value of the multiple voltages V2, delayed by odd multiples of periods of time T/4, to the voltage V1. In other words, the "value corresponding to the voltage V2" may be the voltage V2 itself or the mean value of multiple voltages V2. Moreover, the adder circuit 52a corresponds to a "processing circuit".

==Drive Signal Output Circuit 53==

The drive signal output circuit 53 outputs the drive signal Sdrv for driving the NMOS transistor 23, based on a voltage V3 that is a processing result of the adder circuit 52a.

Specifically, the drive signal output circuit 53 outputs the drive signal Sdrv based on the voltage V3 and the inductor current IL which is an output of the AD converter 41.

The drive signal output circuit 53 includes a PI regulator 60, a multiplier 61, a subtractor 62, a current regulator 63 (automatic current regulator: ACR), an oscillator circuit 64, and a comparator (CMP) 65.

The PI regulator 60 outputs a voltage VA for causing the level of the feedback voltage Vfb to reach the level of the reference voltage Vref, in response to the voltage V3. Note that the subtractor 50, the output circuit 51, the adder circuit 52a, the setting circuit 54, and the PI regulator 60 correspond to, for example, a so-called error amplifier circuit that performs amplification, integration, and the like of the voltage V1.

The multiplier 61 multiples the voltage VA and the voltage Vr together and outputs the multiplication result as a reference current Iref serving as a reference of the inductor current IL.

In an embodiment of the present disclosure, the reference current Iref is a current command value outputted from the multiplier 61, but is simply referred to as reference current Iref for the sake of convenience.

The subtractor 62 subtracts the inductor current IL from the reference current Iref and calculates an error E1 between the reference current Iref and the inductor current IL.

The current regulator 63 outputs a voltage VB for causing the current value of the inductor current IL to reach the current value of the reference current Iref, in response to the error E1. Note that the current regulator 63 according to an embodiment of the present disclosure outputs a positive voltage VB when the reference current Iref is greater than the inductor current IL, and outputs a negative voltage VB when the reference current Iref is smaller than the inductor current IL. Moreover, the subtractor 62 and the current regulator 63 correspond to, for example, a so-called error amplifier circuit that performs amplification, integration, and the like of the error.

The oscillator circuit 64 outputs an oscillator voltage Vosc with a predetermined frequency that changes in a triangular wave shape. The comparator 65 outputs a drive signal Sdrv at low level (hereinafter, referred to as low or low level) when the voltage VB is higher than the oscillator voltage Vosc, and outputs a drive signal Sdrv at a high level (hereinafter, referred to as high or high level) when the voltage VB is lower than the oscillator voltage Vosc.

==Setting Circuit 54==

The setting circuit 54 outputs a cycle setting signal Tset indicating the cycle of the AC voltage Vac, to set, in the output circuit 51, the predetermined period of time T/4 corresponding to the cycle T of the AC voltage Vac. Note that the cycle T of the AC voltage Vac is obtained from the cycle of the voltage Vr. It is assumed here that the cycle T of the AC voltage Vac is obtained from the cycle of the voltage Vr, however, a configuration may be such that the voltage Vr is estimated by integrating the inductor current IL and the cycle T of the AC voltage Vac is obtained from the cycle of the estimated value. Alternatively, a configuration may be such that the voltage Vr is estimated based on a voltage generated in an auxiliary coil electromagnetically coupled to the inductor 22 and the cycle T of the AC voltage Vac is obtained from the cycle of the estimated value. Moreover, the cycle T of the AC voltage Vac may be obtained by using at least two of the aforementioned methods.

<<<Method of Removing Ripple Component ΔVout by Switching Control Circuit 43>>>

Figure 7:
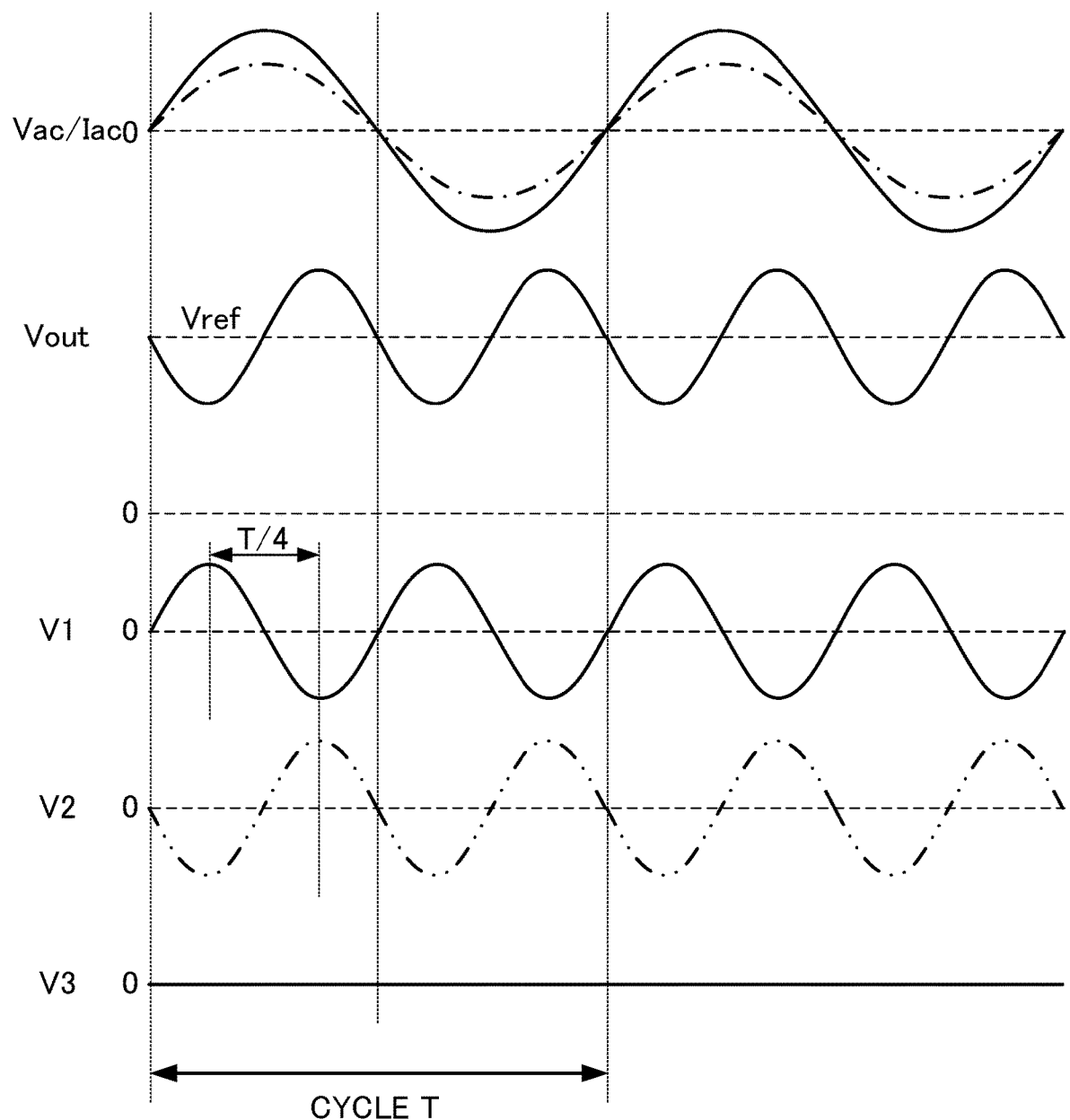
FIG. 7 is a diagram explaining a method of removing a ripple component ΔVout from an output voltage Vout.

FIG. 7 is a diagram explaining a method of removing the ripple component ΔVout from the output voltage Vout by the switching control circuit 43.

The subtractor 50 outputs the voltage V1 by subtracting the feedback voltage Vfb corresponding to the output voltage Vout from the reference voltage Vref. Accordingly, the voltage V1 drops when the output voltage Vout rises by an amount corresponding to the ripple component ΔVout, and the voltage V1 rises when the output voltage Vout drops by an amount corresponding to the ripple component ΔVout.

Then, the storage circuit 70 writes the voltage V1 into the circular buffer according to the write address Waddr from the control circuit 71 to store the voltage V1. Moreover, the storage circuit 70 reads, from the circular buffer, the voltage V1 that has been received the predetermined period of time T/4 prior to the current voltage V1, according to the read address Raddr from the control circuit 71, and outputs the read voltage V1 as the voltage V2.

The voltage V2 is thus the voltage V1 delayed by a half cycle from the current voltage V1. Accordingly, when the AC-DC converter 10 operates in a steady state, the adder circuit 52a adds up the voltage V1 and the voltage V2 and outputs the voltage V3 that is 0. As a result, the ripple component ΔVout is removed in the output voltage Vout.

Meanwhile, when the AC-DC converter 10 is not in the steady state due to an abrupt change in the state of the load 11 and/or the like and a DC value of the output voltage Vout fluctuates, the adder circuit 52a outputs the voltage V3 including the DC fluctuation of the output voltage Vout. Accordingly, the voltage V3 changes according to the DC fluctuation.

Moreover, in an embodiment of the present disclosure, the voltage V3, which is the processing result of the adder circuit 52a, is a value obtained by adding up the current voltage V1 and the voltage V1 that has been received T/4 prior thereto, for example. Accordingly, the DC fluctuation of the output voltage Vout is emphasized in the voltage V3. This enables the switching control circuit 43 to respond to the DC fluctuation of the output voltage Vout caused by an abrupt load change, with a high gain, while removing the ripple component ΔVout.

<<<Operation of Switching Control Circuit 43>>>

Figure 8:
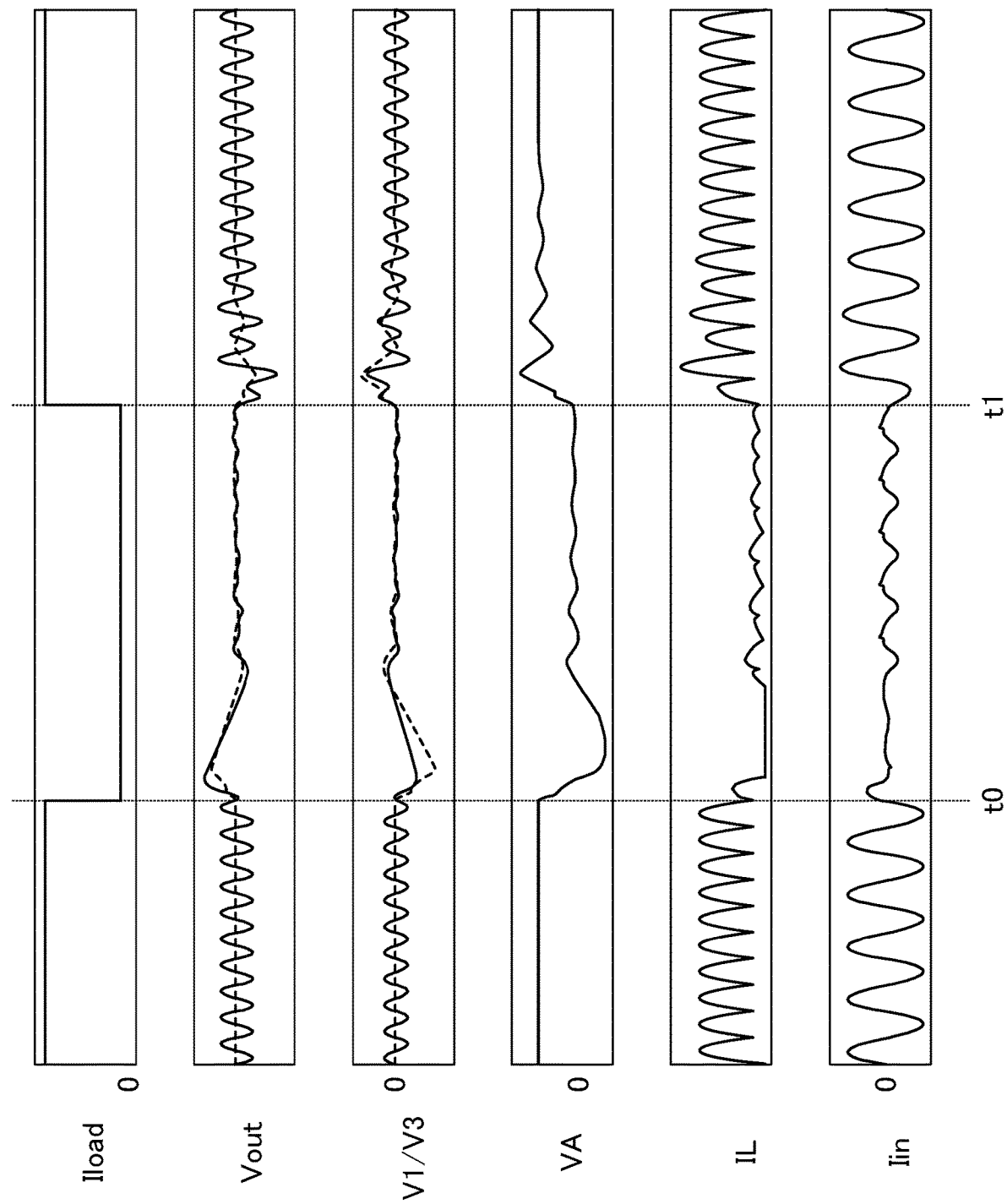
FIG. 8 is a diagram illustrating an operation of a switching control circuit 43.

FIG. 8 is a diagram illustrating an operation of the switching control circuit 43. Note that solid lines of the output voltage Vout, the voltage V1, and the voltage V3 indicate operations without using an embodiment of the present disclosure, and dashed lines of the output voltage Vout, the voltage V1, and the voltage V3 indicate operations using an embodiment of the present disclosure. Since waveforms other than those described above are substantially the same with or without using an embodiment of the present disclosure, these waveforms are given by solid lines. Moreover, a solid line of the inductor current IL is obtained by plotting peak values of the inductor current IL.

Before time t0, a large current Iload is flowing. In this case, when an embodiment of the present disclosure is not used, the output voltage Vout of the AC-DC converter 10 has a waveform containing the ripple component ΔVout. Similarly, the voltage V1, which is an error between the feedback voltage Vfb and the reference voltage Vref, also includes the ripple component.

Meanwhile, in the switching control circuit 43, the adder circuit 52a outputs the voltage V3, which is the processing result including no ripple component, in order to remove the ripple component from the feedback voltage Vfb. This also removes the ripple component ΔVout in the output voltage Vout of the AC-DC converter 10. As a result, the voltage V1 also includes no ripple component.

When the load 11 abruptly changes and the current Iload decreases at time T0, the AC-DC converter 10 outputs the output voltage Vout higher than the target level. This increases the feedback voltage Vfb, resulting in a drop in the voltage V1.

In this case, when an embodiment of the present disclosure is not used, the voltage outputted by the subtractor 50 and inputted to the PI regulator 60 is the voltage V1 which is simply an error between the feedback voltage Vfb and the reference voltage Vref. Note that the voltage V1 is obtained by adding up the DC fluctuation amount of the output voltage Vout and the voltage corresponding to the ripple component ΔVout.

Meanwhile, in the switching control circuit 43, the voltage outputted by the adder circuit 52a and inputted to the PI regulator 60 is the voltage V3. The voltage V3 is a result obtained by adding up the current voltage V1 and the voltage V1 that has been received T/4 prior thereto. Accordingly, the voltage V3 has, for example, the doubled DC fluctuation amount of the output voltage Vout, without containing no ripple component ΔVout.

Accordingly, the fluctuation amount of the ripple component ΔVout is smaller than the DC fluctuation amount of the output voltage Vout. Thus, in the switching control circuit 43, the fluctuation of the voltage inputted to the PI regulator 60 increases. As a result, the PI regulator 60 operates with a high gain with respect to the DC fluctuation of the output voltage Vout and the fluctuation amount of the output voltage Vout decreases.

When the load 11 returns to the original state and the current Iload increases at time t1, the AC-DC converter 10 outputs an output voltage Vout that is lower than the target level. This lowers the feedback voltage Vfb, resulting in a drop in the voltage V1.

In this case, the switching control circuit 43 operates as at time t0 and the fluctuation amount of the output voltage Vout is smaller than that without using an embodiment of the present disclosure.

Accordingly, the switching control circuit 43 removes the ripple component ΔVout in the output voltage Vout. Moreover, at time t1 and time t0 at which the load 11 abruptly changes, the switching control circuit 43 operates such that the fluctuation of the voltage V3 inputted to the PI regulator 60 increases. Thus, the PI regulator 60 operates with a high gain and the fluctuation amount of the output voltage Vout decreases.

MODIFIED EXAMPLE

==Modified Example of Full-wave Rectifier Circuit 20==

An embodiment of the present disclosure describes the example in which the full-wave rectifier circuit 20 is used, however, a full bridge, a half bridge, a hybrid bridge, or the like may be used instead of the full-wave rectifier circuit 20 to convert a single-phase AC voltage Vac to a DC output voltage Vout.

==Modified Example of Output Circuit 51a==

An embodiment of the present disclosure describes that the output circuit 51a includes the storage circuit 70 and the control circuit 71, however, an output circuit 51b may be a delay circuit. The output circuit 51b delays the received voltage V1 by the predetermined period of time T/4, and outputs a resultant voltage as the voltage V2. Specifically, the output circuit 51b calculates the predetermined period of time T/4 in response to the cycle setting signal Tset from the setting circuit 54, and outputs the voltage V1 that has been received the predetermined period of time T/4 prior to the voltage V1, as the voltage V2.

==Modified Example of Adder Circuit 52a==

An embodiment of the present disclosure describes that the ripple component ΔVout is removed by using the adder circuit 52a, however, a subtractor circuit 52b may be used instead of the adder circuit 52a. The subtractor circuit 52b subtracts, from the voltage V1, the voltage V2 which is the voltage V1 delayed by a predetermined period of time T/2. In a modified example, the output circuit 51a outputs, as the voltage V2, the voltage V1 delayed by the predetermined period of time T/2, and the subtractor circuit 52b subtracts the voltage V2 from the voltage V1.

Moreover, the subtractor circuit 52b subtracts the voltage V2 from the voltage V1, however, the present disclosure is not limited thereto. Specifically, the subtractor circuit 52b may subtract a mean value of the multiple voltages V2, delayed by even multiples of periods of time T/4, from the voltage V1. In other words, the "value corresponding to the voltage V2" may be the voltage V2 itself or the mean value of multiple voltages V2. Moreover, the subtractor circuit 52b corresponds to the "processing circuit".

==Modified Example of Signals Inputted to Output Circuit 51a==

In an embodiment of the present disclosure, the output circuit 51a delays the voltage V1 and outputs a resultant voltage as the voltage V2, however, an output circuit 51c may delay the feedback voltage Vfb instead of the voltage V1, remove a DC component in the feedback voltage Vfb, and output a resultant voltage as the voltage V2.

Figure 9:
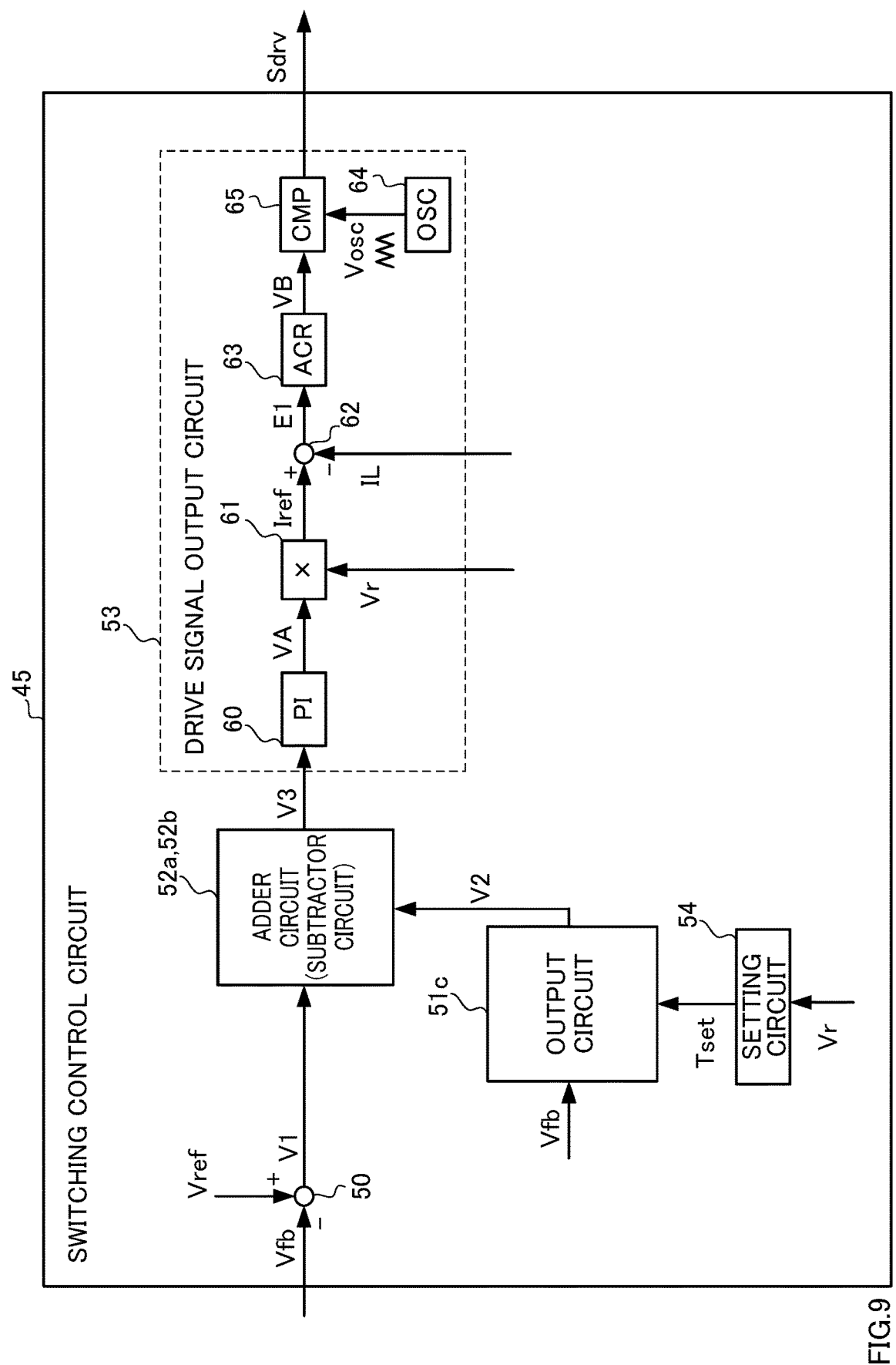
FIG. 9 is a diagram illustrating a configuration of a switching control circuit 45.
Figure 10:
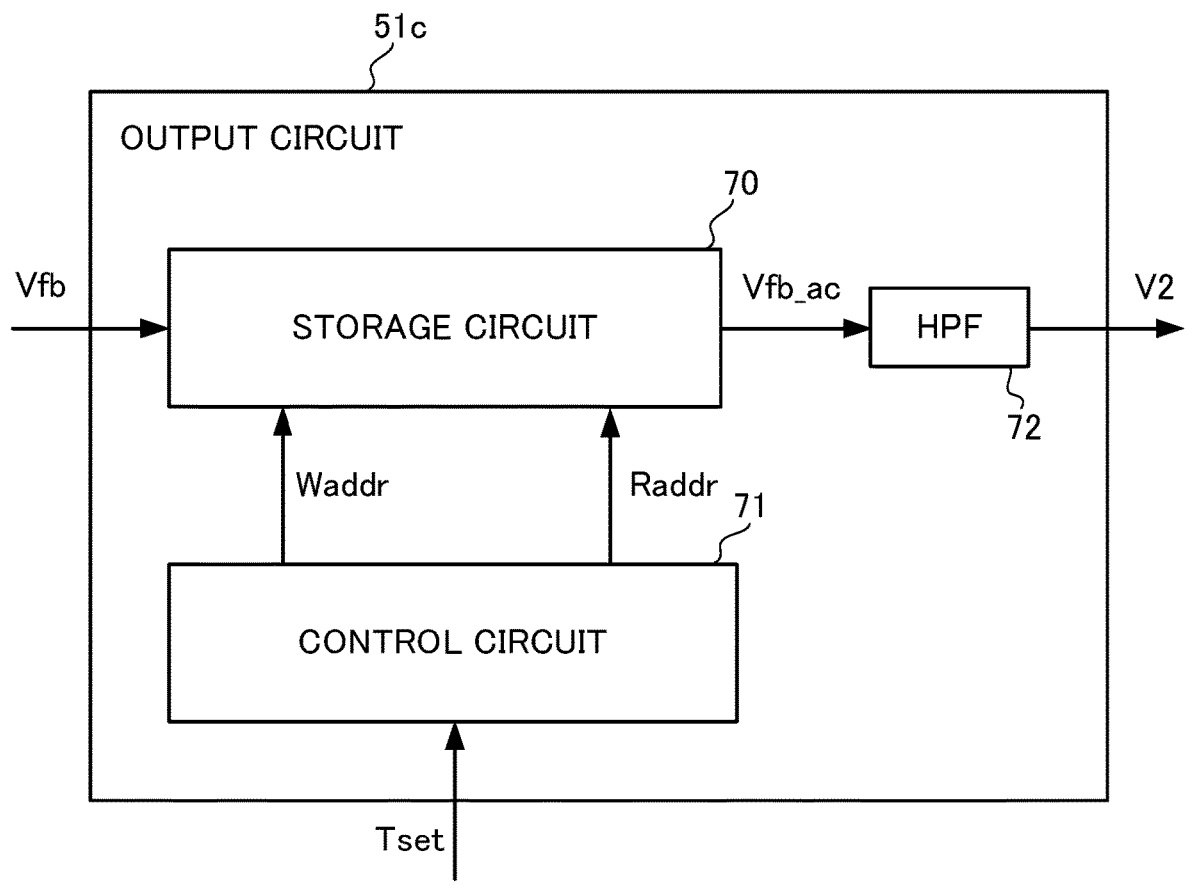
FIG. 10 is a diagram illustrating an example of an output circuit 51c.

FIG. 9 is a diagram illustrating a configuration of a switching control circuit 45 when the output circuit 51c is used. Since parts and elements that are the same as those in FIG. 4 are given the same reference numerals, a description thereof is omitted. Moreover, FIG. 10 is a diagram illustrating an example of the output circuit 51c. Since parts and elements that are the same as those in FIG. 5 are given the same reference numerals, a description thereof is omitted.

The output circuit 51c outputs an AC component of a temporally-prior voltage Vfb, as the voltage V2, to remove a ripple component in the feedback voltage Vfb. The output circuit 51c includes the storage circuit 70, the control circuit 71, and a high-pass filter (HPF) 72. The high-pass filter (HPF) 72 outputs, as the voltage V2, a ripple component of a voltage Vfb_ac that is outputted from the storage circuit 70 and that is the voltage Vfb having been received the predetermined period of time T/4 prior thereto.

SUMMARY

The AC-DC converter 10 according to an embodiment of the present disclosure has been described above. The switching control circuit 43 includes the output circuit 51 and the adder circuit 52a. The output circuit 51 sequentially receives the voltage V1 corresponding to the output voltage Vout, and outputs, as the voltage V2, the received voltage V1 after a delay of the predetermined period of time T4. Moreover, the adder circuit 52a processes the voltage V1 based on the value corresponding to the voltage V2, to remove the ripple component contained in the voltage V1. The switching control circuit 43 thereby removes the ripple component contained in the voltage V1 based on the current voltage V1 and the voltage V2, which is the voltage V1 having been received the predetermined period of time T/4 prior to the current voltage V1. Accordingly, it is possible to provide a switching control circuit capable of reducing the effects of the ripple component ΔVout in the output voltage Vout.

Moreover, the switching control circuit 43 includes the subtractor 50 that outputs, as the voltage V1, an error between the reference voltage Vref and the feedback voltage Vfb corresponding to the output voltage Vout. This makes it possible to remove only the AC component, in other words, the ripple component, in the feedback voltage Vfb, and configure the adder circuit 52a with a simple circuit.

Furthermore, the adder circuit 52a is an adder circuit that adds the voltage V2 to the voltage V1. This makes it possible to appropriately remove the ripple component in the feedback voltage Vfb, as well as respond to the DC fluctuation of the output voltage Vout, with a high gain.

Moreover, the predetermined period of time P is determined by ¼×T×n, where T is the cycle of the AC voltage Vac and n is an odd number equal to or greater than 1. This enables the adder circuit 52a to remove the ripple component of the feedback voltage Vfb.

Furthermore, the subtractor circuit 52b subtracts the voltage V2 from the voltage V1. This makes it possible to remove the ripple component of the feedback voltage Vfb with a simple circuit as in the adder circuit 52a.

Moreover, the predetermined period of time P is determined by ¼×T×n, where T is the cycle of the AC voltage Vac and n is an even number greater than 1. This enables the subtractor circuit 52b to remove the ripple component of the feedback voltage Vfb.

Furthermore, the output circuit 51 includes: the storage circuit 70 configured to store the received voltage V1; and the control circuit 71 configured to cause the storage circuit 70 to output, as the voltage V2, the voltage V1 stored in the storage circuit 70. This makes it possible to operate the storage circuit 70 as a circular buffer, and thus the storage circuit 70 operating as the circular buffer only needs to have a small storage capacity.

Moreover, the output circuit 51 is a delay circuit that delays the received voltage V1 by the predetermined period of time T/4, and outputs a resultant voltage as the voltage V2. This enables the output circuit 51 to output the voltage V2 that is the voltage V1 delayed to remove the ripple component of the feedback voltage Vfb, with a simple circuit.

Furthermore, the switching control circuit 43 includes the ADCs 40 and 41. The sampling cycle SP1 of the ADC 40 is longer than the sampling cycle SP2 of the ADC 41. This makes it possible to sample the feedback voltage Vfb that can be considered substantially as a DC voltage even if the sampling cycle SP1 is not short.

Moreover, the switching control circuit 43 includes the setting circuit 54 that sets, in the output circuit 51, the predetermined period of time T/4 corresponding to the frequency T of the AC voltage Vac. This makes it possible to appropriately remove the ripple component of the feedback voltage Vfb even if the frequency of the AC voltage Vac is not previously set in the switching control circuit 43.

According to an embodiment of the present disclosure, it is possible to provide a switching control circuit capable of reducing the effects of the ripple component in the output voltage.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for controlling a power supply circuit configured to generate an output voltage of a target level from an alternating-current (AC) voltage inputted thereto, the power supply circuit including
   an inductor configured to receive a rectified voltage corresponding to the AC voltage, and
   a transistor configured to control an inductor current flowing through the inductor,
the switching control circuit being configured to control switching of the transistor, the switching control circuit comprising:
   an output circuit configured to
      sequentially receive a first voltage, which contains a ripple component that has been generated in the output voltage and that fluctuates at a frequency twice a frequency of the AC voltage, and
      output, as a second voltage, the received first voltage after a delay of a predetermined period of time;
   a processing circuit configured to process the first voltage based on a value corresponding to the second voltage, which also fluctuates at the frequency twice the frequency of the AC voltage, so as to remove the ripple component contained in the first voltage; and
   a drive signal output circuit configured to output a drive signal for driving the transistor, in response to a processing result of the processing circuit.

2. The switching control circuit according to claim 1, further comprising an error output circuit configured to output, as the first voltage, an error between a reference voltage and a feedback voltage corresponding to the output voltage.

3. The switching control circuit according to claim 1, wherein the processing circuit is an adder circuit configured to add the second voltage to the first voltage.

4. The switching control circuit according to claim 3, wherein the predetermined period of time is determined by ¼×T×n, where T is a cycle of the AC voltage, and n is an odd number equal to or greater than 1.

5. The switching control circuit according to claim 1, wherein the processing circuit is a subtractor circuit configured to subtract the second voltage from the first voltage.

6. The switching control circuit according to claim 5, wherein the predetermined period of time is determined by ¼×T×n, where T is a cycle of the AC voltage, and n is an even number greater than 1.

7. The switching control circuit according to claim 1, wherein the output circuit includes
   a storage circuit configured to store the received first voltage, and
   a control circuit configured to cause the storage circuit to output, as the second voltage, the first voltage stored in the storage circuit.

8. The switching control circuit according to claim 1, wherein the output circuit is a delay circuit.

9. The switching control circuit according to claim 1, further comprising:
   a first analog-to-digital (AD) converter configured to perform a first AD conversion, with a first sampling cycle, to a feedback voltage corresponding to the output voltage; and
   a second AD converter configured to perform a second AD conversion, with a second sampling cycle, to the inductor current, wherein
   the drive signal output circuit outputs the drive signal in response to an output of the second AD converter and the processing result of the processing circuit, and
   the first sampling cycle of the first AD converter is longer than the second sampling cycle of the second AD converter.

10. The switching control circuit according to claim 1, further comprising a setting circuit configured to set, in the output circuit, the predetermined period of time corresponding to the frequency of the AC voltage.

11. A power supply circuit configured to generate an output voltage of a target level from an alternating-current (AC) voltage inputted thereto, the power supply circuit comprising:
   an inductor configured to receive a rectified voltage corresponding to the AC voltage;
   a transistor configured to control an inductor current flowing through the inductor; and a switching control circuit configured to control switching of the transistor, the switching control circuit including
an output circuit configured to
sequentially receive a first voltage, which contains a ripple component that has been generated in the output voltage and that fluctuates at a frequency twice a frequency of the AC voltage, and
output, as a second voltage, the received first voltage after a delay of a predetermined period of time,
a processing circuit configured to process the first voltage based on a value corresponding to the second voltage, which also fluctuates at the frequency twice the frequency of the AC voltage, so as to remove the ripple component contained in the first voltage, and
a drive signal output circuit configured to output a drive signal for driving the transistor, in response to a processing result of the processing circuit.

* * * * *